United States Patent [19]

Duckeck

[11] Patent Number: 4,476,573

[45] Date of Patent: Oct. 9, 1984

[54] RADIO LINK REMOTE CONTROL SIGNALING SYSTEM, AND METHOD

[75] Inventor: Hans Duckeck, Hildesheim, Fed. Rep. of Germany

[73] Assignee: Blaupunkt-Werke GmbH, Hildesheim, Fed. Rep. of Germany

[21] Appl. No.: 435,688

[22] Filed: Oct. 21, 1982

[30] Foreign Application Priority Data

Nov. 7, 1981 [DE] Fed. Rep. of Germany ....... 3144289

[51] Int. Cl.³ .......................... H04B 1/00; H04B 1/16

[52] U.S. Cl. ...................................... 455/45; 455/228; 455/70; 340/825.69

[58] Field of Search ........................ 455/38, 45, 68, 59, 455/205, 227, 228, 70; 340/825.44, 825.69, 825.72

[56] References Cited

U.S. PATENT DOCUMENTS

| | | | |
|---|---|---|---|
| 2,979,566 | 4/1961 | Hopner et al. | 455/45 |
| 3,922,607 | 11/1975 | Wysong | 455/45 |
| 3,949,401 | 4/1976 | Hegeler et al. | 455/227 |

FOREIGN PATENT DOCUMENTS

| | | | |
|---|---|---|---|
| 2460983 | 1/1976 | Fed. Rep. of Germany | 455/227 |
| 2651817 | 5/1977 | Fed. Rep. of Germany | 455/45 |

OTHER PUBLICATIONS

Rundfunktechnische Mitteilungen, vol. 12, (1968), issue 5, pp. 214, 216.

*Primary Examiner*—Jin F. Ng

*Attorney, Agent, or Firm*—Frishauf, Holtz, Goodman & Woodward

[57] ABSTRACT

To permit simultaneous transmission of command codes, in binary command words, with traffic or other announcements, being broadcast over an FM transmitter which has a 57 kHz subcarrier AM modulated by an announcement recognition (AR) signal, for example 125 Hz, use is made of the long response time of AR switching elements to provide, before the AR switching element (13) can respond, decoding of a command word at a clock rate which is fast with respect to the response time of the long switching time constant switching element (13). This fast response is, preferably, accomplished by a counter (18) which has only the number of count positions corresponding to the bits in the command word, then provides an overflow to block a memory (15) in which the bits are being stored; a second counter (20)—or a continuing portion of the counter—counting at the clock rate for a period of time longer than the response time of the switching element (13) to then cause unblocking of the memory, for subsequent reception of command words, which may occur during transmission of the AR signal, by merely short interruptions thereof, insufficiently long to prevent drop-out of the switching element (13) of the AR system. A decoder (30) is connected to decode the expected command words, but reject AR signals, the characteristics of both of which are known.

13 Claims, 4 Drawing Figures

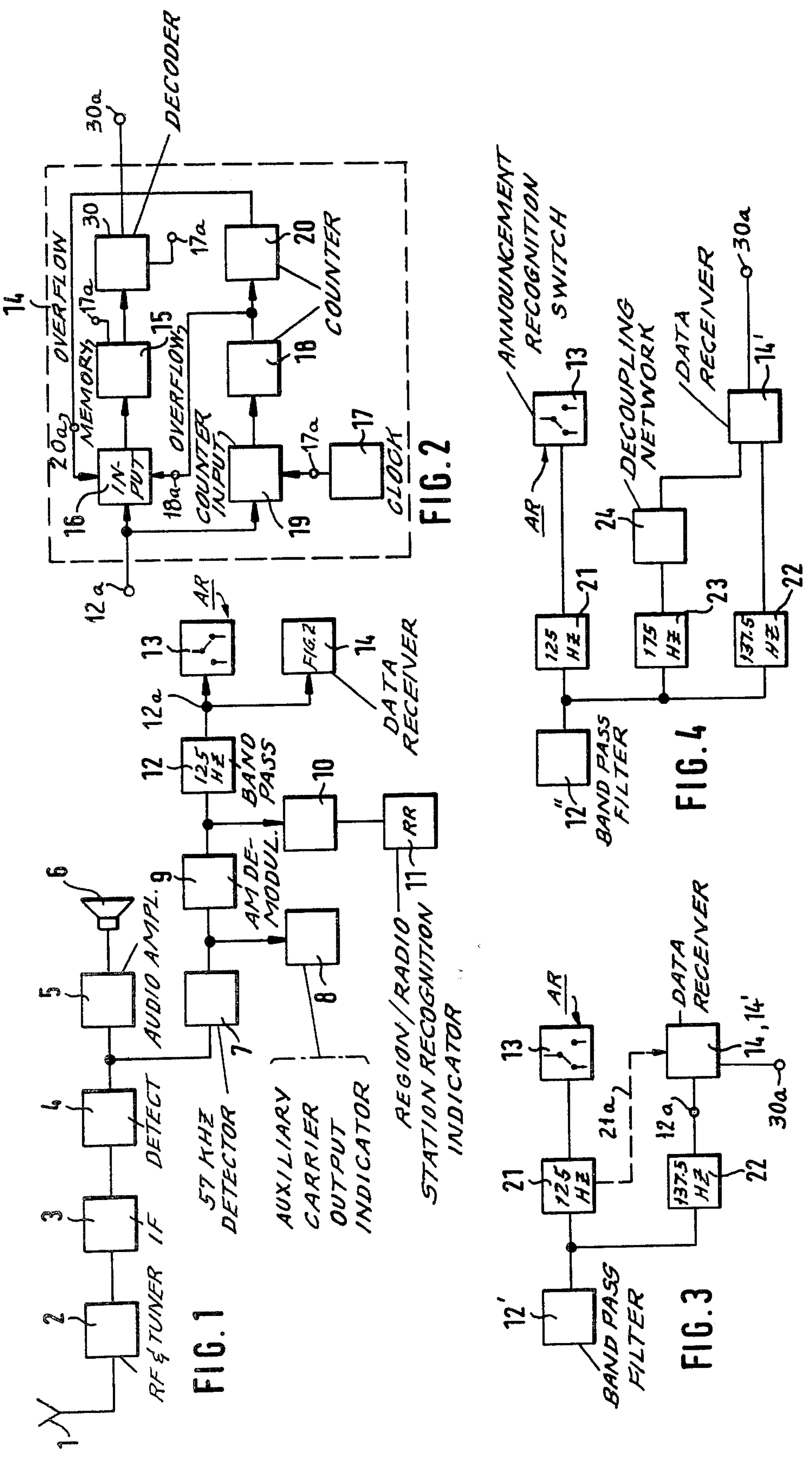

FIG.1
RF & TUNER
IF
DETECT
AUDIO AMPL.
57 KHZ DETECTOR
AUXILIARY CARRIER OUTPUT INDICATOR
AM DE-MODUL.
REGION/RADIO STATION RECOGNITION INDICATOR
RR
12,5 HZ
BAND PASS
12a
AR
FIG.2
DATA RECEIVER
FIG.2
OVERFLOW
MEMORY
IN-PUT
OVERFLOW
COUNTER INPUT
COUNTER
CLOCK
DECODER
30a
20a
17a
18a
FIG.3
BAND PASS FILTER
12,5 HZ
137,5 HZ
21a
12a
DATA RECEIVER
14,14'
30a
AR
FIG.4
BAND PASS FILTER
12,5 HZ
17,5 HZ
137,5 HZ
DECOUPLING NETWORK
DATA RECEIVER
ANNOUNCEMENT RECOGNITION SWITCH
AR
30a

RADIO LINK REMOTE CONTROL SIGNALING SYSTEM, AND METHOD

Reference to related publication "Rundfunktechnische Mitteilungen", Vol. 12 (1968), issue 5, pp. 214,216.

Reference to Related Patent and Applications Assigned to the Assignee of this application and incorporated herein by reference:

- U.S. Pat. No. 3,949,401, Hegeler et al., issued Apr. 6, 1976
- U.S. Ser. No. 06/319,653, filed Nov. 9, 1981, Eilers and Bragas, "Communication System and Transmitter Therefor, Including Special Announcement Recognition"
- U.S. Ser. No. 06/319,654, filed Nov. 9, 1981, Eilers and Bragas. "FM Receiver for General Programs and Special Announcements"
- U.S. Ser. No. 06/319,655, filed Nov. 9, 1981, Eilers and Bragas "FM Receiver for Reception of Special Announcements and General Programs"

The present invention relates to a remote control system and more particularly to a remote control system which a radio link and which is so arranged that specific information transmitted in binary form over a subcarrier on a radio communication channel can be readily decoded, and separated from other information being transmitted over a radio transmission channel.

Background

The referenced publication "Rundfunktechnische Mitteilungen" (information on radio technology) describes remote control systems for use in combination with radio stations in which an ultra high frequency (UHF) transmitter, for example operating within the frequency modulation (FM) commercial band has modulated thereon a frequency of 50 kHz in addition to the radio program. The subcarrier of 50 kHz has low modulation, and is continuously modulated on the normal carrier frequency of the transmitter. This additional frequency is used to synchronize quartz oscillator generators of medium wave transmitters.

The frequency of 50 kHz, forming a normalizing frequency, can be interrupted, that is, this subcarrier can be used to transmit remote control commands by interrupting the subcarrier in form of a binary pulse sequence with a repetition of operating frequency of 100 BAUD. The pulse sequence is used to transmit remote control commands to control rapidly responding transfer switches in a transmitter station. This frequency, for example, may be used to transmit such remote control commands from a studio to a remote transmitter, or from one remote transmitter to another.

Television converters which have slowly responding transfer switches, and which may be associated with the transmitters can be switched by providing another subcarrier, for example of 37.5 kHz, transmitted by the UHF transmitters. The 37.5 kHz subcarrier is radiated only if a command, in form of a pulse sequence must be transmitted. The transmission of such a command may have a duration of up to about 10 seconds.

The Invention

It is an object of the present invention to reduce the system and apparatus requirements to control, respectively, rapidly responding and slowing responding transfer switches, and to utilize only a single subcarrier which can control, selectively, the rapidly and slowly responding switches so that remote control commands can be radiated from a radio station on which only a single subcarrier is modulated.

Briefly, a data receiver is connected to receive first and second control modulations which, respectively, control slowly and rapidly responding switching devices. The data receiver is arranged to respond, respectively, to the respective control modulations and, in accordance with a feature of the invention, differentiation is done this way: a memory is provided having a capacity of receiving only a predetermined number of binary signals. A clock controls storage of the binary signals in the memory. The clock has a repetition rate which is capable of controlling storage of that number of binary signals in the memory for which it is designed during a period of time which is less than the switching response time of the slowly responding switching element. The memory is blocked for a period of time which exceeds this switching response time. The switching response time, that is, the change of state of the slowly responding switching response element, preferably, is the same for switching from a first to a second mode, and back from a second to a first mode.

In accordance with a feature of the invention, the memory includes a counter which, when the count number corresponding to the predetermined number of binary signals is exceeded provides an overflow signal which blocks further storage of data in the memory and enables a second counter to count out the remainder of the time required for the switching response time of the slowly operating switching devices.

The system of the present invention is particularly adapted for combination with transmission systems in which switching commands are transmitted on a subcarrier, for example to characterize particular types of transmission. Details of such particular types of transmissions are explained in the referenced U.S. Pat. No. 3,949,401, Hegler et al., which describes a transmission and reception, that is, a radio information system in which radio stations broadcast programs which, however, can be interrupted by special announcements, for example traffic or emergency announcements. To be sure that a user or operator of the radio is tuned to a station which does provide such special announcements, the radio station, or various radio stations within a region radiate, in addition to the program, or information signal, a 57 kHz subcarrier on which, depending on the radio station or region, a particular radio station or region recognition frequency or signal, hereinafter RR signal is modulated. The receiver operator, thus, can tune—manually or automatically—to radio stations which, in addition to their program, radiate the particular RR frequency. At the time when an announcement is being broadcast, the subcarrier is modulated by a special announcement recognition, hereinafter AR, frequency which can be detected in the receiver and used to effect switching function therein, for example by cancelling a muting switch which previously silenced reproduction of the program from the transmitter; or by changing-over reproduction of program content taken from a magnetic tape, or other stored transducer, to enable the operator or user to hear the special announcement. Details of such systems are also disclosed in the referenced Eilers and Bragas applications Ser. Nos. 06/319,653, 06/318,654, and 06/319,655.

In accordance with a feature of the invention, additional switching commands can be transmitted to receivers which are designed for reception of these commands without an additional subcarrier. The receivers need not, necessarily, have a reproduction portion which also reproduces the special announcements, that is, which respond to the AR signals. The receivers, however, must be able to distinguish between the remote control commands and the AR signals. In accordance with a feature of the present invention, the remote control system permits transmission of information additional to the special announcements, that is, the AR signal. The already present decoding system permits transmission of additional information, since the presently used system is completely compatable with FM programming and radiation thereof.

In accordance with a feature of the invention, a 125 Hz modulation on the subcarrier is radiated not only to characterize an announcement—that is, to form the AR signal—and to thereby control switching within the receiver designed therefore, but, additionally, to itself form a remote control command signal which, in binary form, permits transmission of remote control commands for those receivers which are capable of decoding these commands, and, of course, can distinguish between the commands which are radiated in binary form and the switching commands characterized in an announcement.

The receivers which are capable of receiving the special announcements, particularly for use in automobile radios and especially in combined automobile radio/cassette recorders utilize transfer switches which have a long response time constant. In accordance with a feature of the invention, the long response time constant of the customarily used switch-over elements is used to descriminate between rapidly transmitted remote control commands before the long response time switching elements can respond.

As in all remote control systems, and particularly in those which utilize a single transmission channel, assurance against malfunction or erroneous response must be provided. The auxiliary AM modulation of 125 Hz is modulated on the 57 KhZ subcarrier in form of amplitude modulation, the 57 kHz subcarrier additionally being modulated by further amplitude modulation (AM) frequencies which are used for recognition of the radio station or region—the RR signal. Continuous transmission of a third modulation on the 57 kHz subcarrier, with a further third AM modulating frequency is, therefore, excluded for all practical purposes. Reliability of unambiguous decoding of remote control commands with respect to AR signals can be obtained, however, by utilizing a counter in the decoding circuit which is so matched to the bits of the command that the counter provides an overflow output well in advance of the response time of the switching elements which are to respond to the AR, or the RR signal.

In accordance with the prior art—see, for example, the referenced "Rundfunktechnische Mitteilungen" literature, the 50 kHz normalizing frequency can be used to effect control of switching of a rapidly operating switch in a transmitter and, further, synchronization of an oscillator. For synchronization, short-time interruption of radiation of the auxiliary carrier does not matter, since the oscillator will continue to operate, at its quartz control frequency, for some time without drift. Short sequential pulses of the 50 kHz frequency, that is, the normalizing frequency which form the bits of a command word also do not interfer with synchronization, since the 50 kHz auxiliary carrier only provides a reference value which is readily available for sufficient time in the form of a pulses following the pulse gaps of the binary words which comprise the remote control command word.

In the systems of the referenced Hegler U.S. Pat. No. 3,949,401, and as explained in detail in the referenced Eilers and Bragas applications, the AR frequency or signal of 125 Hz is modulated on the subcarrier only when an announcement is actually being given.

Drawings

FIG. 1 is a general block diagram of a receiver capable of responding both to announcement recognition signals and to remote control command words;

FIG. 2 is a detailed circuit diagram of the command word data receiver portion;

FIG. 3 is a fragmentary diagram of the command word decoding portion illustrating a modification;

FIG. 4 is another fragmentary diagram illustrating another modification.

Detailed Description

The antenna 1 of a radio receiver receives transmitted signals, for example within the commercial UHF-FM band, and conducts signals to a RF tuner and input stage 2. The tuner 2 can be tuned manually, or automatically, for example it may have a signal search circuit, for tuning to a desired transmitter. The tuner 2 is connected to an intermediate frequency (IF) stage 3, which provides its output signal to a detector 4, a ratio detector, from which program audio information in the form of audio signals can be received, amplified in audio amplifier 5 for reproduction in the loud speaker 6. Other circuits, for example noise filtering, limit a circuit limiter and the like have been omitted from the diagram for clarity and can be used, as well known.

Some of the receivers which can be tuned by the tuner 2, in addition to the program content modulated on the carrier by FM modulation, also radiate a 57 kHz subcarrier, which is provided to transmit switching commands from the transmitter to the receiver, or to provide information regarding the capability of the particular transmitter to provide specific announcements, or to characterize a specific geographic location of the transmitter.

The auxiliary 57 kHz subcarrier, which is modulated both by commands and information was utilized to characterize those transmitters which, more or less regularly, provide special announcements, for example traffic, or emergency announcements, news, sports announcements or the like. During such an announcement, the 57 kHz subcarrier has a 125 Hz AM modulation applied thereto. The degree of modulation may change, for example be in the order of about 30%; the referenced Eilers and Bragas applications describe various modulation possibilities. The amplitude of the 57 kHz subcarrier is also continuously modulated with the region, or radio station recognition signal (RR). The frequency of the additional RR signal will depend on the geographical location, or the particular characteristics of the transmitter. The RR frequency may vary between about 20 Hz to just under 125 Hz. The degree of modulation by the RR signal, at least during absence of the AR signal may be higher, for example about 60%. Various changes in modulation degree may be made, and reference is made to the referenced applications for details of the systems and appropriate modulations.

The standard radio receiver, for example an FM automobile receiver which has the elements 1-6, if adapted to also receive special announcements radiated by specially adapted or authorized and characterized transmitters, includes a 57 kHz detector 7 which is connected to the output of the ratio detector 4. The 57 kHz detector 7, which detects a 57 kHz FM modulation on the original signal received by the antenna 1 is connected to an auxiliary carrier output indicator 8 which indicates the presence of the auxiliary 57 kHz subcarrier, that is, that the particular transmitter does radiate this subcarrier. The indicator 8 may, additionally, be used for switching. In addition, the 57 kHz detector 7 provides an output to an AM demodulator 9 to demodulate the amplitude modulation applied to the 57 kHz subcarrier. The output signal from demodulator 9 is applied to two filters 10 and 12, which are respectively arranged and designed to select different frequency bands. Filter 10 is a low pass filter which selects those frequencies which are within the frequency range of the RR signal, that is, below 125 Hz, for example between 20 to 60 Hz. The filter 10 is connected to a stage 11, which forms a region or radio station recognition indicator 11. Indicator 11, additionally, may be used to provide switching signals, may have selector switches connected thereto so that the user can select a specific region, or radio station or the like. The second filter 12 is a band pass filter which filters the 125 Hz modulation for the AR switching network 13. The AR switching network is provided in those receivers which can reproduce special announcements, that is, which will reproduce the program content amplified by audio amplifier 5 and the loudspeaker 6 during the presences of the AR, that is, 125 Hz signal. Circuit 13 can, additionally, be used to enable reproduction from loudspeaker 6 if the loudspeaker, previously, has been muted, or, for instance, to transfer reproduction from a recorded, e.g. tape recorded program to the special announcement.

In accordance with standard procedure, the transfer switch 13 has a long response time constant. This response time constant, of course, is short with respect to the duration of even the shortest announcement which would be radiated by the transmitter, for reproduction through loudspeaker 6.

In accordance with a feature of the present invention, a special data decoder, or data receiver 14 is connected in parallel with the switching network 13. The output terminal 12*a* from the 125 Hz band pass filter 12 thus is connected to both the stages 13 and 14.

Data receiver and decoder 14—see FIG. 2—is provided to decode the command words, in form of pulse bits, or binary pulse signals which utilizes the 125 Hz oscillation. The respective pulses preferably should have a duration of 10 to 15 periods or undulations of the 125 Hz frequency. A pulse command word of 16 bits thus will have a duration of about a second. Such a pulse command word can readily be decoded by the decoding or data receiver 14 without interfering with proper switching functions of the AR switch 13.

The data receiver or decoder 14, in accordance with a feature of the invention, includes a memory 15 having an input circuit 16. The incoming signals, coupled from terminal 12*a* are connected through the input circuit 16 to the memory 15, and, additionally, to a counter input stage 19 of a first counter 18. Stage 14 further includes a clock generator 17. The clock pulses are counted in the first counter 18 as soon as the first pulse of a command word is sensed by the counter input 19, thus opening the input to the counter 18 and causing the counter to count. The counter 18 has the number of bit positions which correspond to the bit number of a data word. The clock pulses, in accordance with well known technology, control reading-in of the bits of the pulse command word into the memory 15, as well as evaluation of the stored data, in a decoder 30, the output of which is transmitted to an output terminal 30*a*. The clock 17 has a clock output terminal 17*a* which, as well known, controls the memory 15 as well as the decoder 30.

The first counter 18 has an overflow line 18*a* which is connected to a control input terminal of the input stage 16 for the memory 15. If an overflow pulse is derived from counter 18, the input stage 16 will block. Subsequent count pulses, however, are counted in the second counter 20. The overflow terminal from the counter 20 is connected to a line 20*a* which is connected to the input terminal 16 to unblock, or release the input stage 16.

The frequency, or repetition rate of the clock 17 is so selected that the duration of the entire pulse word, that is, the storage time within the memory 15, or the counting time within the counter 18 before an overflow pulse occurs, is less the response time constant of the AR switch 13. The number of count positions of the second counter is so selected that, upon subsequent counting beyond overflow of the counter 18, the time for the second overflow pulse on line 20*a* is above the response time constant of the transfer switching stage 13.

Operation

The transfer switching stage 13 will not respond, either upon transmission of a single remote control command word, or upon transmission of several subsequent remote control command words, since the duration of any one remote control command word is less than the response time of the transfer switching circuit 13 which, as noted, may for example disable a muting circuit as soon as an AR signal is being radiated. In accordance with a feature of the invention, sequential command words are separated by a pause which is longer than the response time period of the switching network 13, so that even subsequent command words cannot be decoded, erroneously, as an AR signal. The change-over of switching from one state to another, and back from the other state to the first of the transfer switch 13 should be about the same. This insures that a command word which is superimposed on radiation of an announcement recognition, AR signal, does not trigger the return of the switching stage 13 to its first state, or, in other words, does not cause switching stage 13 to erroneously consider that the announcement has been terminated, and thus changes over to the previous state during which the AR signal normally would be absent. Thus, it is possible to radiate the AR signal, with rapid interruptions to form a command word which, however, overall are substantially shorter than the response time of the switch 13, regardless of the switching state thereof. If the return switching time is shorter, then command words cannot be radiated during presence of the AR signal.

If a command word follows immediately upon termination of a AR signal, the AR switching state 13 will retain its switched state. Since, however, no further announcement is being radiated, merely keeping the AR switch in switched state for the extremely short period of another command word will not interfere with operation of the system or interfere with listening by a user.

The system requires at the transmitter an arrangement which provides for a similar clock frequency as clock 17, which controls radiation of the command word, and maintenance of the same pauses or pause duration between successive remote control command words. Additionally, the transmitter should be so arranged that it, selectively, can radiate the 125 Hz signal to indicate an announcement, or to transmit remote control command words. Further, the transmitter should be so interlocked that if a command word is to be transmitted during an announcement, that is, when the AR signal is modulated on the 57 KhZ subcarrier, the data word for remote control command is transmitted only after the overall time for counting by the two counters 18 and 20 has elapsed, that is, that first the response time of the switch 13 is considered before a command word is transmitted. Preferably, the total time for counting by both counters 18, 20 is somewhat longer than the response time of the switch 13, to accommodate tolerances and variations in response time of various switches 13 in various receivers. The counting time of the two counters 18, 20, thus forms a convenient overall time before a remote control command work can be transmitted during transmission of an AR signal. Preferably, a multiple of this time of both counters 18, 20, should be used. This is desirable since, as looked at from the receiver, the duration of the radiation of the 125 Hz AM modulation will be considered as the beginning of a command word which, however, will not be decoded in form of a command since it will persist after the overflow line 18*a* has responded. Of course, the decoder 30 can readily be arranged to distinguish between a command word and an AR recognition signal in accordance with well-known decoding technology.

FIG. 3 illustrates another embodiment. Both circuits are identical up to the output of the AM demodulator 9. The band pass, however, should have a slightly different pass characteristic. Thus, band pass filter 12 should be capable of separating 125 Hz as well as 137.5 Hz from the RR signals. In accordance with the feature of the invention of FIG. 3, two parallel control frequency filters 21, 22 are connected to the output from band pass filter 12'. The control frequency filter 21, which has a characteristic pass frequency of 125 Hz is connected to the AR transfer switch 13. The filter 22 is connected to the data receiver 14 via terminal 12*a*. In accordance with the system of FIG. 3, the command frequency is radiated by modulating the 57 kHz subcarrier by a frequency different from the AR frequency, for example 137.5 Hz. In accordance with this system, the AR frequency is interrupted during transmission of a command word. The duration of the command word, and the pauses between two subsequent command words do not interfer with the switching of the long response time switching element 13, and will not influence the response thereof.

Interruption of the radiation of the AR frequency at the transmitter is necessary since only one further frequency can be modulated on the 57 kHz subcarrier besides the RR frequency, selected by the filter 10. Thus, in the embodiment of FIG. 3, the 57 kHz subcarrier is selectively AM modulated with the command word at 137.5 Hz or the AR frequency at 125 Hz.

Actual experiments have shown that, apparently, the embodiment of FIG. 3 has a higher degree of ambiguity rejection than that discussed in connection with FIGS. 1 and 2.

Embodiment of FIG. 4: The band pass filter 12'' which has an even wider band pass than filter 12' is connected to three frequency filters 21, 22, 23. Filter 21, again, selects the 125 Hz AM modulation to control the transfer switch 13. Filter 22 selects 137.5 Hz to control the data receiver 14'. Filter 23 is set to select a frequency of 175 Hz, the output of which, for example via decoupling network 24, is connected to the data receiver 14'.

Operation

If no announcement frequency 125 Hz, that is, the AR signal is being radiated, a command data word can be radiated by frequency shift technology, in which, rather than providing pulses and pulse gaps, the frequency of the modulation is shifted between 137.5 Hz and 175 Hz, depending upon whether a binary-one or a binary-zero is to be transmitted. The data receiver 14', then, will respond to frequency shift, rather than to pulses and absences of pulses. Frequency shift technology, and decoding thereof is well known. The variation thus described can also be utilized in the system of FIG. 3, as indicated by the broken line 21*a*, connected from the 125 Hz filter 21 to the data received 14, which, then, should be of the frequency-shift response type, similar to data receiver 14'. Utilizing this variation, frequency-shift is carried out between 125 and 137.5 Hz, that is, utilizing the AR frequency with very short response time constant. This variation is particularly suitable if, from a transmitter, the command data word is transmitted by way of frequency-shift between the 125 Hz and the 137.5 Hz frequencies.

It is not necessary that the data receiver 14 forms part of an overall automotive-type announcement receiver which includes the switching network 13; if the receiver is arranged only to decode command words, for example to control transmitter functions, or to effect other remote control functions, the portion of the receiver including stages 5, 6 and 13 can be omitted. Yet, since the transmitter will transmit both the AR signals, to be received in receivers designed for their reception, as well as the command words, unambiguous decoding, respectively, of the AR signals, and the remote control command data words is necessary, which is effect by the decoding circuits 14, 14', respectively.

Various changes and modifcations may be made within the scope of the inventive concept.

I claim:

1. Remote control system having a radio transmition link on which a signal comprising program information and binary control information is being transmitted between a transmitting station and a receiving station on an ultra-high frequency carrier, said program information is frequency modulated (FM) on the carrier, an auxiliary carrier (57 kHz) which is frequency modulated on said ultra-high frequency carrier, a first control modulating signal (AR) which is amplitude modulated (AM) on the auxiliary carrier, and adapted for effecting receiver switching with long switching response time characteristics, a second control modulating signal which is AM modulated on the auxiliary carrier in the form of a predetermined number of bits, forming command words, which have a repetition rate such that the command words are short with respect to said switching response time of said long switching response time characteristic, said receiving station comprising a detector for detecting said auxiliary carrier, a demodulator coupled to said detector for providing said first and second control modulating signals, a data receiver (14) connected to said demodulator to receive the first and the second control modulating signals, and having means for responding only to the second of the control modulating signals comprising a memory (15) having a capacity of receiving only said predetermined number of bits forming said command words;

and a clock (17) controlling storage of said bits in the memory, said clock having a repetition rate which is capable of controlling storage of said number of bits in the memory during a time less than said switching time, and means (**18*a***) for blocking storage of information in said memory for a period of time which exceed said switching response time.

2. System according to claim 1 wherein the switching response time of switching from a first to a second state and from a second state to a first state is equal.

3. System according to claim 2 wherein the gap between sequential command words is longer than said switching response time.

4. System according to claim 1 wherein said data receiver (14) comprises two sequentially connected counters (18, 20), and said means for blocking the memory (15) comprises an overflow connection (**18*a***) from the first counter to the memory to block storage of bits in the memory when the first counter has an overflow;

and wherein the second counter (20) has a count number which, at the clock frequency, or clock repetition rate of said clock provides an overflow output occuring after said response time has elapsed, said overflow output from the second counter being connected to unblock the memory.

5. System according to claim 1 including (FIGS. 3, 4) two filters (21, 22; 22, 23, 24) connected to the input of the data receiver and, respectively, being tuned to different frequencies to provide for discrimination between the first and second control modulating signals.

6. System according to claim 5 wherein the command words are transmitted in form of frequency-shift signals.

7. System according to claim 6 wherein the frequency-shift of said command words is between the frequency of said first control modulating signal and a different frequency characteristic of the second control modulating signal.

8. System according to claim 6 wherein the frequency-shift is between two frequencies differing from said first control modulating signal.

9. System according to claim 6 wherein, during transmission of the first control modulating signal, the second control modulating signal is absent; and, conversely, during transmission of the second control modulating signal, the first control modulation is absent.

10. Method of remotely controlling and providing a control output (**30*a***) utilizing a radio link on which control information and other information is being transmitted, comprising the steps of providing a UHF carrier;

frequency modulating said UHF carrier with audio information;

frequency modulating an auxiliary subcarrier (57 kHz) on said carrier;

amplitude modulating said auxiliary subcarrier with a first control modulating signal (AR) to effect switching in a receiver of a switching stage (13) which has a long switching response time characteristic;

amplitude modulating the auxiliary subcarrier with a second control modulating signal in the form of a predetermined number of binary signals forming command words which have a repetition rate and transmission time which are short with respect to said switching response time;

transmitting all the modulated signals on said UHF carrier;

receiving said so modulated and transmitted signals;

providing a clock time base (17);

storing received signals in a memory having only the capacity of the number of bits in said command words, under control of said clock, and blocking storage of further signals applied to said memory subsequent to filling of the memory by the binary signals of said command words to thereby distinguish between command words having a time duration which are short with respect to said long switching response time, and decoding the signals stored in the memory with respect to predetermined command word codes to (a) store and decode only command words, and (b) provide for response to said first control modulating signal only when said first control modulating signal persists for the duration of said long switching response time.

11. Method according to claim 10 including the step of counting binary signals, and storing binary signals in the memory only if the count number matches a predetermined count;

and continuing counting at the rate of said clock for a period of time at least as long as said long switching response time, and then unblocking the memory, to permit response to the first control modulating signal by apparatus having said long switching response time without spurious response due to ambiguity within a command word.

12. Method according to claim 10 including the step of changing the frequency between said first control modulating signal with respect to said second control modulating signal, and transmitting, selectively, only the one, or the other of said control modulating signals.

13. Method according to claim 12 wherein the command words are transmitted by frequency-shift characterization of respective values of the bits of the command words.

* * * * *